R. JENNETT.
CHANGE GEAR.
APPLICATION FILED MAY 28, 1920.
1,375,846.
Patented Apr. 26, 1921.
4 SHEETS—SHEET 1.
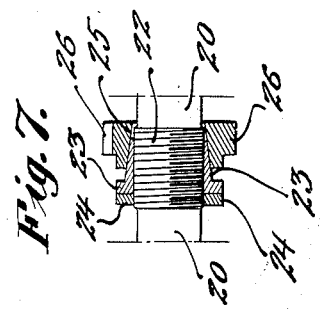
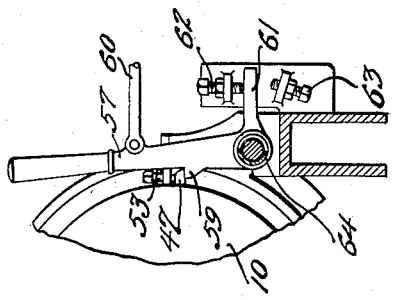
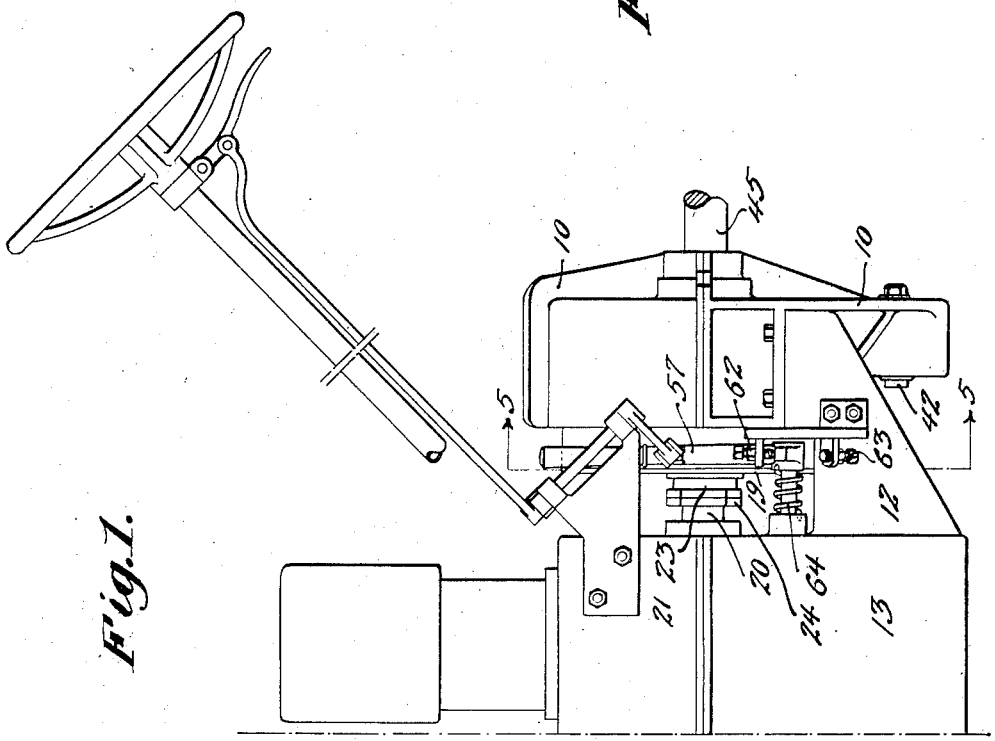
Witnesses
Geo. A. Gruss
Augustus B. Coppee
Inventor
Robert Jennett
By Joshua R. H. Potts
his Attorney

R. JENNETT.
CHANGE GEAR.
APPLICATION FILED MAY 28, 1920.

1,375,846.

Patented Apr. 26, 1921.
4 SHEETS—SHEET 2.

Witnesses
Geo. A. Gruss
Augustus B. Coppes

Inventor
Robert Jennett
By Joshua R. H. Potts
his Attorney

R. JENNETT.
CHANGE GEAR.
APPLICATION FILED MAY 28, 1920.

1,375,846. Patented Apr. 26, 1921.
4 SHEETS—SHEET 3.

Witnesses
Geo. A. Gruss
Augustus B. Copes

Inventor
Robert Jennett
By Joshua R. H. Potts
his Attorney

R. JENNETT.
CHANGE GEAR.
APPLICATION FILED MAY 28, 1920.

1,375,846.

Patented Apr. 26, 1921.

4 SHEETS—SHEET 4.

Witnesses
Geo. A. Gruss
Augustus B. Coppes

Inventor
Robert Jennett
By Joshua R. H. Potts
his Attorney

UNITED STATES PATENT OFFICE.

ROBERT JENNETT, OF CHESTER, PENNSYLVANIA.

CHANGE-GEAR.

1,375,846.          Specification of Letters Patent.      Patented Apr. 26, 1921.

Application filed May 28, 1920. Serial No. 384,848.

*To all whom it may concern:*

Be it known that I, ROBERT JENNETT, a citizen of the United States, residing at Chester, in the county of Delaware and State of Pennsylvania, have invented certain new and useful Improvements in Change-Gears, of which the following is a specification.

One object of my invention is to provide an improved power transmission change gear mechanism which will be operative, upon a simple easy movement of a detent member such as a hand lever, to effect a change of gears automatically by power derived from an engine or motor such for example as the motor which transmits power through the gear. Thus with the use of my invention it is unnecessary to manually shift the gear in changing from one speed drive to another.

Another object is to make my improved change gear of a strong and durable construction and to prevent the stripping of the gear teeth.

A still further object is to so arrange the parts that they will be practically noiseless during operation.

These objects, and other advantageous ends which will be described hereinafter, I attain in the following manner, reference being had to the accompanying drawings in which—

Figure 3:
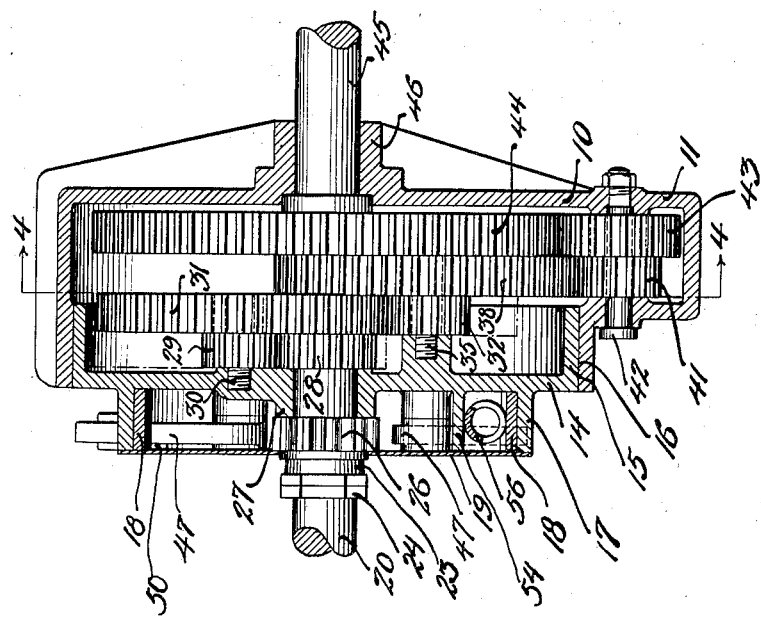
Figure 2:
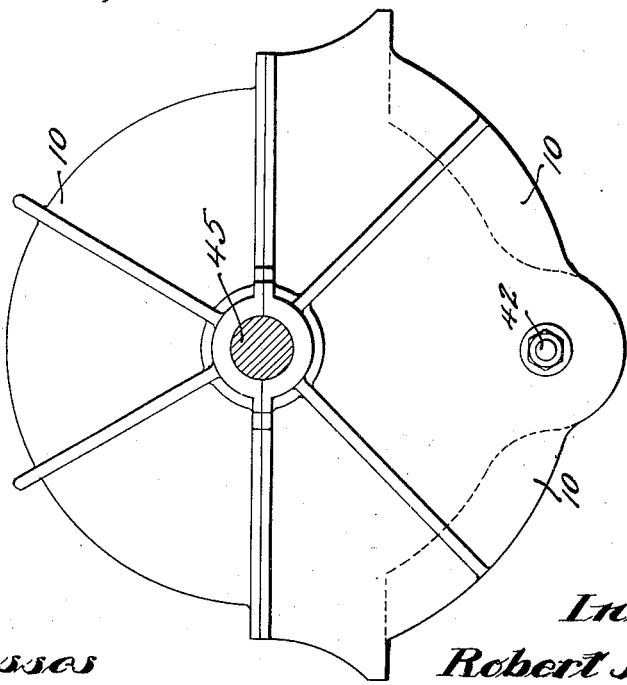
Figure 5:
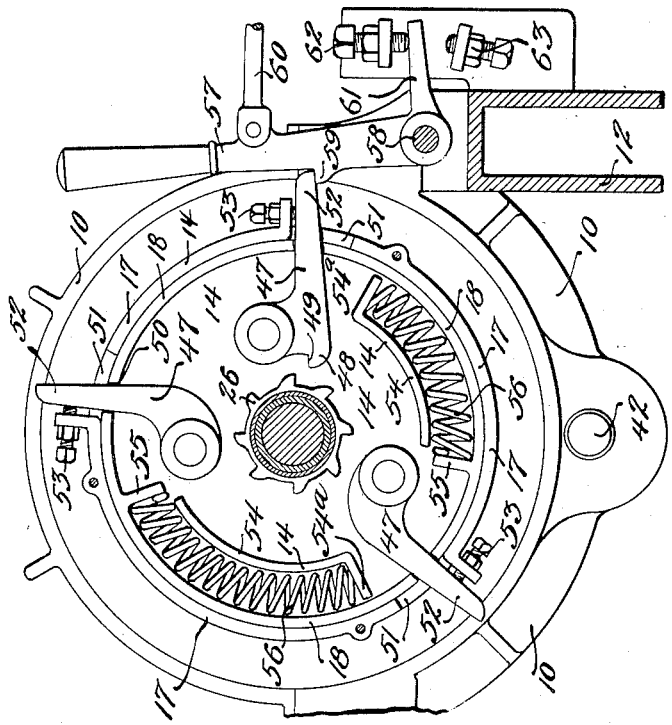
Figure 4:
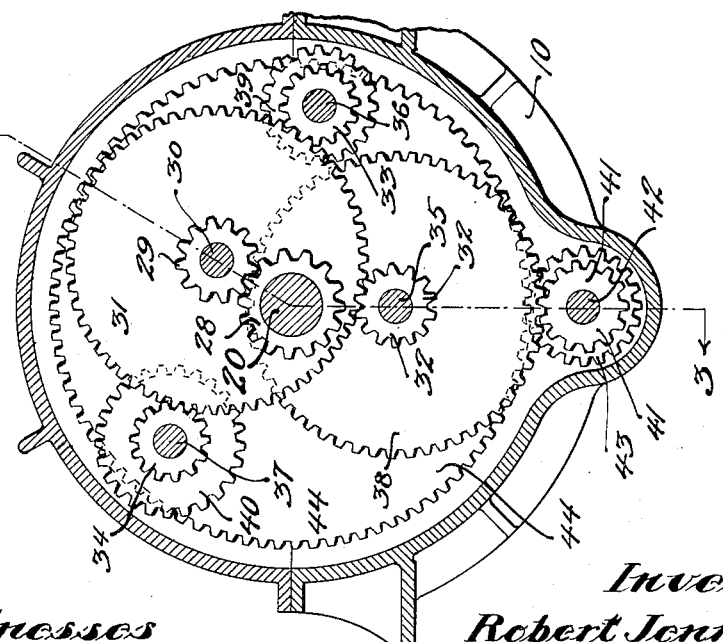
Figure 9:
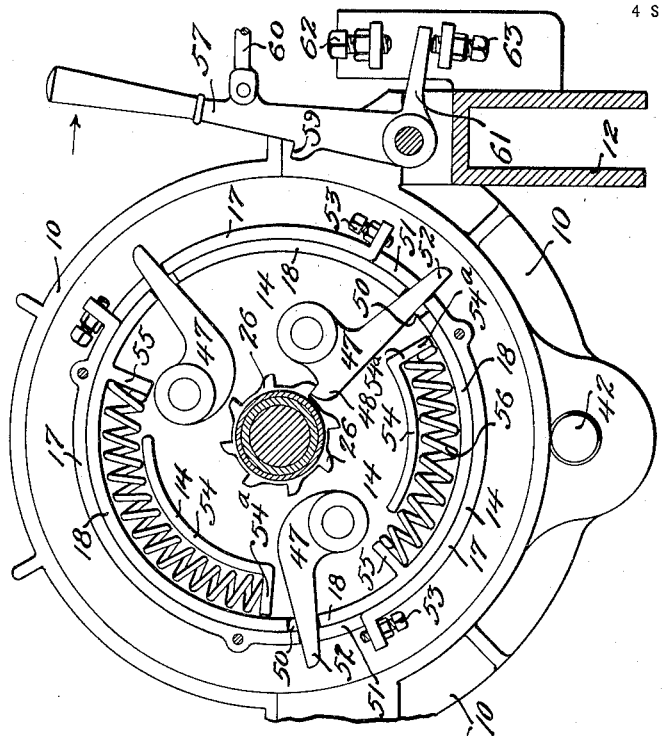
Figure 8:
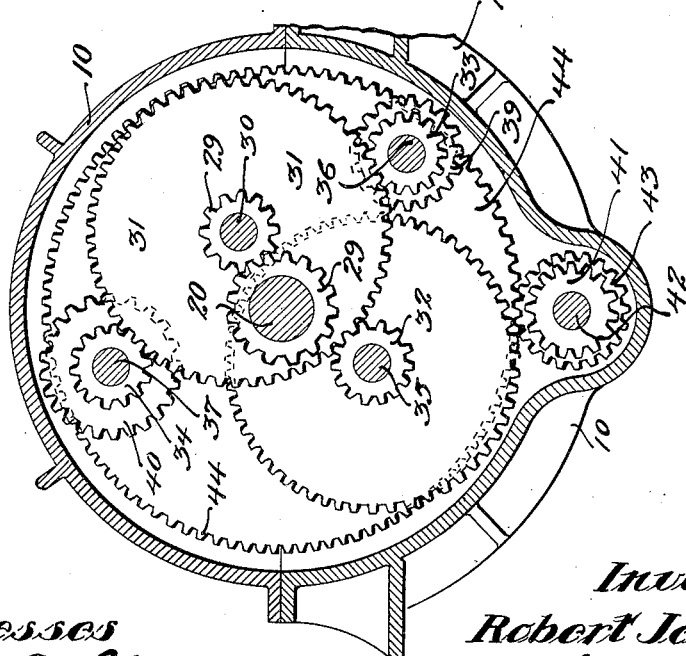

Figure 1 is a fragmentary side elevation showing my invention as applied to an automobile, Fig. 2 is an end elevation of Fig. 1, Fig. 3 is a section taken on the line 3—3 of Fig. 4, Fig. 4 is a section taken on the line 4—4 of Fig. 3, Fig. 5 is a section taken on the line 5—5 of Fig. 1 and showing the parts in the arrangement illustrated in Figs. 3 and 4, Fig. 6 is a fragmentary section showing certain of the features illustrated in Fig. 5 and illustrating the gear casing in outside view, Fig. 7 is a fragmentary section showing certain of the features of my invention, Fig. 8 is a view of similar character to Fig. 4 showing the parts in a position occupied when changing from one speed to another, and Fig. 9 is a view of similar character to Fig. 5 showing how the release of a hand-lever permits the movement of the gears in changing from one speed to another; said Fig. 9 agreeing with Fig. 8 as to position of parts.

Referring to the drawings, 10 represents a gear casing including a part 11 which may be secured in a fixed position in any suitable manner to a supporting structure such for example, as the supporting structure 12 which projects from the motor casing 13 on an automobile. A disk 14 has a flange 15 rotatably fitting within a cylindrical opening 16 of the part 11 of the casing 10. The disk 14 also has an outwardly projecting annular flange 17 and within the space provided by said flange 17, a ring 18 is fitted so as to be free to oscillate. A cover-plate 19 forms a covering for the space within the flange 17 and ring 18 as clearly shown in Fig. 3. A drive shaft 20, such for example as a drive shaft for the motor 21 as shown in Figs. 1 and 3, has a bearing in the disk 14 so as to be freely rotatable and said drive shaft includes a screw threaded portion 22 as shown in Fig. 7. A friction cone 23 has a screw threaded bore fitting the screw threaded portion of the drive shaft 20 and said friction cone is locked in position by a nut 24. The outer conical surface of the friction cone 23 frictionally engages a frusto-conical bore of a detent ratchet wheel 26; the outer face of said detent ratchet wheel abutting a boss 27 of the disk 14 which provides the bearing for the drive shaft as above described. The end of the drive shaft within the casing 10 has a drive gear 28 secured thereto which meshes with a pinion 29; said pinion being freely rotatable on a stud 30 which is secured within the disk 14 so that the pinion 29 is in the same plane with the drive gear 28. The stud 30 also supports a gear wheel 31 of larger diameter than the pinion 29; said gear wheel 31 being rotatable in conjunction with the pinion 29 and being in such plane as to pass freely in front of the drive gear 28 as clearly shown in Figs. 3 and 4. The gear wheel 31 meshes with pinions 32, 33 and 34; said pinions being respectively freely rotatable on studs 35, 36 and 37 which are secured to the disk 14 and project into the casing 10. The pinions 32, 33 and 34 have change gears 38, 39 and 40 respectively secured thereto; said studs 35, 36 and 37 being spaced apart in substantially annular formation so that said change gears occupy different positions within the casing as clearly shown in Fig. 4. Any one of the change gears 38, 39 and 40 is adapted, under certain conditions hereinafter described, to operatively engage or mesh with a master gear wheel 41 which is rotatable on a stud or counter-shaft 42 which extends through the bottom portion of the casing as clearly shown in Figs. 3 and 4. Another gear wheel 43 on the stud or counter-shaft 42 is operatively connected to the master gear 41 and meshes with a large driven gear 44 within the casing; said gear 44 being secured to the driven shaft 45 to which power is to be transmitted; said driven shaft having a bearing 46 in the casing as clearly shown in Fig. 3. The disk 14 has three arms 47 pivoted thereon as shown in Fig. 5; one of said arms having a projection 48 providing a shoulder 49. The arms 47 extend through notches or slots 50 in the ring 18; said arms also projecting outwardly through slots 51 in the flange 17 of the disk 14.

The notches 50 are made only of sufficient width to permit the arms to extend therethrough and also to permit any slight change of position due to the swinging of the arms from the position shown in Fig. 5 to the position shown in Fig. 9. The slots 51 in the flange 17 however are made comparatively long as illustrated and the outer end portions 52 of the arms are adapted to abut the ends of adjustable set screws 53 in the normal position of the gear such for example as when the driven shaft 45 is in motion.

Arcuate lugs 54 project from the disk 14 in spaced relation to the inner surface of the ring 18; said lugs also including angular bent parts 54ª which project toward the ring 18. The ring 18 has projecting lugs 55 and in this manner housings are formed for coiled springs 56. One end of each spring engaging a lug 55 on the ring while the other end of the spring engages the part 54ª of the lug 54 and tends to move the ring 18 clockwise as viewed from Fig. 5.

A lever 57 is pivoted at 58 on the supporting structure 12; said lever having an extending tooth 59 adapted to engage under any one of the arms 47 which moves in contact therewith. This lever 57 is connected by a link connection 60 so that the tooth 59 can be moved from under an engaging arm 47 such for example as in the position illustrated in Fig. 9. The lever 57 is preferably provided with a foot 61 adapted to engage between two adjusting screws 62 and 63 which are mounted on the supporting structure and which serve to limit the movement of the lever 57 in opposite directions. A torsion spring 64 is preferably connected to the lever 57 at the pivot 58 as shown in Fig. 6 and serves to move and normally retain the tooth 59 in the position shown in Fig. 5.

In the present embodiment of my invention I have illustrated a structure designed to give three different speeds to the driven shaft 45, considering that the rotation of the drive shaft 20 is constant and the structure is such that the change can be effected even though the drive shaft is running at a high rate of speed; it not being necessary to slow down on the motor when it is desired to change gears.

In the operation of my invention having a structure as above described and considering that the parts are in the positions illustrated in Figs. 1 to 7 inclusive, the drive will be imparted from the drive gear 28 to the pinion 29, gear 31, pinion 32, gear 38, master gear 41, gear 43 and gear 44 to the driven shaft 45. To change the speed it is merely necessary to move the lever 57 on its pivot to free the end 52 of the arm 47 which it is holding and the springs 56 will then act to partially rotate the ring 18 and in so doing the arm 47, having the shoulder portion 49 thereon, will be thrown into engagement with the teeth of the detent ratchet 26. This ratchet is rotating under friction at the speed of the drive shaft 20 and due to the sudden contact with the shoulder 49 of the arm 47, the ratchet will slightly yield to take up the shock. However, this yielding will soon stop owing to the degree of friction between the friction cone and the detent ratchet and the disk 14 will then be rotated until the next arm 47 in the series engages the teeth 59 of the lever 57; it being noted that the lever 57 is permitted to move back into its normal position immediately after having been actuated. When said next arm 47 in the series engages the tooth 59 of the lever 57, the portion 52 of said latter arm will be held and a slight continued forward movement of the disk 14 will cause the shoulder 49 to be moved out of engagement with the teeth of the detent ratchet and the disk will be stopped when the gear 39 comes fully in mesh with the master gear; it being noted that during said latter action, the springs 56 will again be placed under tension and the device will be the same as it was before the operation with the exception that a different ratio of gears will be in operation to effect a difference in speed. It will be noted that the change gears have a planet movement and for this reason the teeth of the change gears are brought into contact with the master gear from the side thereof or in other words move in the same plane and, as such, there is little chance of breaking of the teeth and furthermore the same is practically noiseless during the change of speeds. It is thus obvious that to effect a change of speed, it is merely necessary to move the lever to free the arm 47 which is in engagement therewith, after which the lever 57 can be released during the change of the gears and will be in position to engage the next arm in the series as the latter moves into circuit.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. Change gear mechanism including a drive member; a driven member; a series of change gears adapted to operatively connect said drive and driven members; and common means movable to automatically effect movement of any of the gears of said series into operative connection with said drive and driven members; substantially as described.

2. Change gear mechanism including a drive member; a driven member; a series of change gears in common connection with said drive member; a master gear operatively connected to said driven member; and means automatically operative to move in a circular path the gears of said series into driving engagement with said master gear; substantially as described.

3. Change gear mechanism including a drive gear; a rotatable support; change gears carried by said support; a common drive connection for said change gears and drive gear and carried by said support; a master gear mounted independently of said support; a driven member operatively connected to said master gear; and common means movable into a position for automatically effecting movement of said support to successively move said change gears into engagement with said master gear; substantially as described.

4. Change gear mechanism including a drive gear; a support rotatable concentrically around the axis of said drive gear; change gears carried by said support; a common drive connection carried by said support and including gear wheels respectively in operative connection with said drive gear and said change gears; a master gear mounted independently of said support; a driven member operatively connected to said master gear; and means for automatically effecting movement of said support to successively move said change gears of the series into engagement with said master gear; substantially as described.

5. Change gear mechanism including a drive gear; a support rotatable around the axis of said drive gear; change gears carried by said support; a common drive connection carried by said support and including gear wheels respectively in operative connection with said drive gear and said change gears; a master gear mounted independently of said support; a driven member operatively connected to said master gear; a series of arms pivotally connected to said rotatable support; a ratchet driven in conjunction with said drive gear; a member movably connected to said arms and having a movement independent of said support; means automatically operative to impart said movement to said latter member, one of said arms having a portion for engagement with said ratchet whereby the ratchet is operative to rotate said support through the medium of said latter arm; and a member having a portion adapted to hold said arm out of engagement with said ratchet and to hold said member against movement by said automatic means, said holding member being movable to permit said automatic means to move said second mentioned member to cause said arm to move into engagement with said ratchet whereby said support will be rotated to move one of said change gears out of engagement with said master gear and the next change gear of the series into engagement with the master gear; substantially as described.

6. Change gear mechanism including a drive shaft; a drive gear connected to said shaft; a ratchet in frictional connection with said drive shaft; a support rotatable around the axis of said drive gear; change gears carried by said support; a common drive connection carried by said support and including gear wheels respectively in operative connection with said drive gear and said change gears; a master gear mounted independently of said support; a driven member operatively connected to said master gear; a series of arms pivotally connected to said rotatable support; a member movably connected to said arms and having a movement independent of said support; means automatically operative to impart said movement to said latter member, one of said arms having a portion for engagement with said ratchet whereby the ratchet is operative to rotate said support through the medium of said latter arm; and a member having a portion adapted to hold said arm out of engagement with said ratchet and to hold said second mentioned member against movement by said automatic means, said holding member being movable to permit said automatic means to move said second mentioned member to cause said arm to move into engagement with said ratchet whereby said support will be rotated to move one of said change gears out of engagement with said master gear and the next change gear of the series into engagement with the master gear; substantially as described.

7. Change gear mechanism including a casing; a disk having a portion rotatably mounted within said casing; a drive shaft having a free bearing in said disk; a ratchet on said drive shaft; a driven shaft having a bearing in said casing; a gear on said driven shaft; a master gear having a rotatable support in said casing; a flange on said disk surrounding said ratchet and having slots therein; a ring movably mounted adjacent said flange and having notches; springs for moving said ring relatively to said flange; arms pivotally connected to said disk and having portions extending through said notches and slots in the ring and flange, one of said arms having a portion for engagement with said ratchet; a series of change gears carried by said disk and movable in the plane of and into and out of engagement with said master gear; and stopping means movable into the path of said arms to cause disengagement of the ratchet and the rotatable movement of said disk whereby said change gears can be successively moved into operative engagement with said master gear when said stopping means is moved to release said arms; sustantially as described.

In testimony whereof I have signed my name to this specification in the presence of two subscribing witnesses.

ROBERT JENNETT.

Witnesses:
 ELIZABETH GARBE,
 CHAS. E. POTTS.